United States Patent
Cho et al.

(10) Patent No.: US 12,122,951 B2
(45) Date of Patent: Oct. 22, 2024

(54) METHOD OF PRODUCING QUANTUM DOT, QUANTUM DOT PRODUCED BY THE SAME, AND PHOTODEVICE COMPRISING THE QUANTUM DOT

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Kyungsang Cho, Gwacheon-si (KR); Sohee Jeong, Seoul (KR); Taewan Kim, Suwon-si (KR); Yooseong Yang, Yongin-si (KR); Seongmin Park, Gwangju (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 278 days.

(21) Appl. No.: 17/571,738

(22) Filed: Jan. 10, 2022

(65) Prior Publication Data
US 2022/0298414 A1    Sep. 22, 2022

(30) Foreign Application Priority Data
Mar. 18, 2021   (KR) .................. 10-2021-0035347

(51) Int. Cl.
*C09K 11/74* (2006.01)
*B82Y 20/00* (2011.01)
(Continued)

(52) U.S. Cl.
CPC .......... *C09K 11/7492* (2013.01); *C01G 28/00* (2013.01); *C09K 11/883* (2013.01);
(Continued)

(58) Field of Classification Search
CPC .... C09K 11/883; C09K 11/7492; C01G 28/00
See application file for complete search history.

(56) References Cited

U.S. PATENT DOCUMENTS

2012/0018764 A1    1/2012   Choi et al.

FOREIGN PATENT DOCUMENTS

| CN | 110746975 A | | 2/2020 |
|---|---|---|---|
| EP | 376092 | * | 1/2020 |

(Continued)

OTHER PUBLICATIONS

Tamang et al, "Tuning Size and Size Distribution of Colloidal InAs Nanocrystals via Continous Supply of Prenucleation Clusters on Nanocrystal Seeds", Chem. Mater, 2016, 28, 8119-8122, Oct. 28, 2016.*

(Continued)

*Primary Examiner* — C Melissa Koslow
(74) *Attorney, Agent, or Firm* — Sughrue Mion, PLLC

(57) ABSTRACT

According to an aspect, a method of preparing quantum dots includes a first operation of preparing a quantum dot seed solution; a second operation of growing a quantum dot by continuously injecting a quantum dot cluster solution into the quantum dot seed solution; a third operation of separating the grown quantum dot and dispersing the quantum dot in a solvent; and a fourth operation of further growing the quantum dot by continuously injecting the quantum dot cluster solution into the dispersed quantum dot.

20 Claims, 5 Drawing Sheets

(51) Int. Cl.
  *B82Y 40/00* (2011.01)
  *C01G 28/00* (2006.01)
  *C09K 11/88* (2006.01)

(52) U.S. Cl.
  CPC ............. *B82Y 20/00* (2013.01); *B82Y 40/00* (2013.01); *C01P 2004/64* (2013.01)

(56) References Cited

FOREIGN PATENT DOCUMENTS

| JP | 2011-029301 | * | 2/2011 |
| JP | 6336731 B2 | | 6/2018 |
| KR | 10-1981975 B1 | | 8/2019 |

OTHER PUBLICATIONS

Srivasta et al, "Facile, Economic and Size-Tunable Synthesis of Metal Arsenide Nanocrystals", Chem. Mater. 2016, 28, 6797-6902, Aug. 30, 2016.*

Supporting Information for "Facile, Economic and Size-Tunable Synthesis of Metal Arsenide Nanocrystals", Aug. 30, 2016.*

Srivastava et al., "Facile, Economic and Size-Tunable Synthesis of Metal Arsenide Nanocrystals," American Chemical Society, Chemistry of Materials, vol. 28, pp. 6797-6802, 2016.

Song et al., "Energy level tuned indium arsenide colloidal quantum dot films for efficient photovoltaics," Nature Communications, vol. 9, No. 4267, 2018, Total 9 pages.

Zhao et al., "General Synthetic Route to High-Quality Colloidal III-V Semiconductor Quantum Dots Based on Pnictogen Chlorides," American Chemical Society, Journal of the American Chemical Society, vol. 141, pp. 15145-15152, 2019.

Harris et al., "Improved Precursor Chemistry for the Synthesis of III-V Quantum Dots," American Chemical Society, Journal of the American Chemical Society, vol. 134, pp. 20211-20213, Dec. 10, 2012.

Battaglia et al., "Formation of High Quality InP and InAs Nanocrystals in a Noncoordinating Solvent," American Chemical Society, Nano Letters, vol. 2, No. 9, pp. 1027-1030, 2002.

Lee et al., "Synthesis of colloidal InAs/ZnSe quantum dots and their quantum dot sensitized solar cell (QDSSC) application," Elsevier, Optical Materials, vol. 49, pp. 230-234, 2015.

Xie et al., "Synthetic Scheme for High-Quality InAs Nanocrystals Based on Self-Focusing and One-Pot Synthesis of InAs-Based Core-Shell Nanocrystals," Angew. Chem. Int. Ed., vol. 47, pp. 7677-7680, 2008.

Srivastava et al., "Monodisperse InAs Quantum Dots from Aminoarsine Precursors: Understanding the Role of Reducing Agent," American Chemical Society, Chemistry of Materials, vol. 30, pp. 3623-3627, 2018.

Konstantatos et al., "Sensitive solution-processed visible-wavelength photodetectors," Nature Photonics, vol. 1, pp. 531-534, 2007.

Franke et al., "Continuous injection synthesis of indium arsenide quantum dots emissive in the short-wavelength infrared," Nature Communications, vol. 7, No. 12749, Nov. 11, 2016, Total 9 pages.

Tamang et al., "Tuning Size and Size Distribution of Colloidal InAs Nanocrystals via Continuous Supply of Prenucleation Clusters on Nanocrystal Seeds," American Chemical Society, Chemistry of Materials, vol. 28, pp. 8119-8122, 2016.

* cited by examiner

1 : 200,000

METHOD OF PRODUCING QUANTUM DOT, QUANTUM DOT PRODUCED BY THE SAME, AND PHOTODEVICE COMPRISING THE QUANTUM DOT

CROSS-REFERENCE TO RELATED APPLICATION

This application is based on and claims priority under 35 U.S.C. § 119 to Korean Patent Application No. 10-2021-0035347, filed on Mar. 18, 2021, in the Korean Intellectual Property Office, the disclosure of which is incorporated by reference herein in its entirety.

BACKGROUND

1. Field

The present disclosure relates to a method of producing a quantum dot, a quantum dot produced by the same, and a photodevice including the quantum dot.

2. Description of the Related Art

InAs quantum dots with a small bulk bandgap are expected to be used in electronic devices of a near infrared/infrared range. For quantum dots of which optical and electrical characteristics are controlled according to the size thereof, it is very crucial to ensure the size uniformity of the quantum dots. In the synthesis of InAs quantum dots, a strategy to control size uniformity through the reactivity control of precursors has shown limitations.

Recently, a continuous precursor injection process has been proposed, and its effects of ensuring size uniformity and improving reaction yield have been reported. However, in the continuous injection process, with continuing injection of a precursor (cluster) solution, the concentration of precursors (cluster) present in the solution decreases and the distance between the precursors (cluster) and quantum dots increases. Accordingly, in diffusion-dependent growth for producing uniform-size quantum dots, the diffusion rate of the precursors (cluster) decreases and the growth rate of the quantum dots decreases. In addition, due to an increase of excess precursors (cluster) that were not involved in the reaction, reaction-dependent growth takes place, and thus, the size of the quantum dots becomes non-uniform, and secondary nuclear growth occurs causing the growth of quantum dots to stop. According to a report of the prior art, the absorption wavelength of InAs quantum dots is limited to 1200 nm, which does not reach the wavelengths of 1300 nm and 1550 nm, required for optical communication or the like.

SUMMARY

Provided is a method of producing a quantum dot in a short-wavelength infrared region.

Provided is a quantum dot in a short-wavelength infrared region with excellent size uniformity.

Provided is a photodevice including the quantum dot in a short-wavelength infrared region.

Additional aspects will be set forth in part in the description which follows and, in part, will be apparent from the description, or may be learned by practice of the presented example embodiments of the disclosure.

According to an aspect, provided is a method of producing a quantum dot, the method including a first operation of preparing a quantum dot seed solution; a second operation of growing a quantum dot by continuously injecting a quantum dot cluster solution into the quantum dot seed solution; a third operation of separating the grown quantum dot and dispersing the quantum dot in a solvent; and a fourth operation of further growing the quantum dot by continuously injecting the quantum dot cluster solution including quantum dot components, into the dispersed quantum dot.

The second operation and the fourth operation may be each performed until the quantum dot grows to a predetermined size in each of the second operation and the fourth operation.

The third operation and the fourth operation may be repeatedly performed until the quantum dot grows to a predetermined size.

The quantum dot may be a Group II-VI, Group III-V or Group IV-VI compound semiconductor material.

The quantum dot may include GaN, GaP, GaAs, GaSb, InN, InP, InAs, InGaAs, InSb, AlN, AlP, AlAs, AlSb, GaN, GaP, GaAs, GaSb, ZnO, ZnS, ZnSe, ZnTe, ZnCdSe, ZnCdTe, ZnCdS, CdS, CdSe, CdSeTe, CdSeZn, CdTe, HgS, HgSe, HgTe, GeSe, or GeTe.

According to another aspect, provided is a method of producing an InAs quantum dot, the method including a first operation of preparing an InAs quantum dot seed solution; a second operation of growing the InAs quantum dot by continuously injecting an InAs quantum dot cluster solution into the InAs quantum dot seed solution; a third operation of separating the InAs quantum dot; and a fourth operation of further growing the InAs quantum dot by continuously injecting the InAs quantum dot cluster solution into the InAs quantum dot.

The InAs quantum dot finally grown may have a diameter of 3 nm to 12 nm.

The InAs quantum dot finally grown may have an absorption wavelength of 1400 nm to 1600 nm.

The InAs quantum dot seed solution in (b) may be a solution heated to 100-350° C.

The InAs quantum dot cluster solution in the second operation may be of room temperature.

The second operation) may be performed until the InAs quantum dot has a certain size.

The second operation may be performed until the InAs quantum dot has a certain absorption wavelength.

The second operation may be performed until the absorption wavelength of the InAs quantum dot does not change.

The third and the fourth operations may be repeatedly performed until the quantum dot grows to a predetermined size.

The InAs quantum dot seed solution may be prepared by injecting an As precursor solution into an In precursor solution.

The InAs quantum dot cluster solution may be prepared by causing an In precursor solution to react with an As precursor solution in a ratio of 11:1 to 1:11 by volume at room temperature.

According to another aspect, provided is an InAs quantum dot produced by the InAs quantum dot production method, wherein the InAs quantum dot has an absorption wavelength of 1400 nm or more and an average diameter of 6 nm to 12 nm and a diameter relative standard deviation of 20% or smaller.

The InAs quantum dot may have an absorption wavelength of 1400 nm to 1600 nm.

According to another aspect, provided is a photodevice including a light-absorption layer including the InAs quantum dot.

The photodevice may further include a photodetector.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
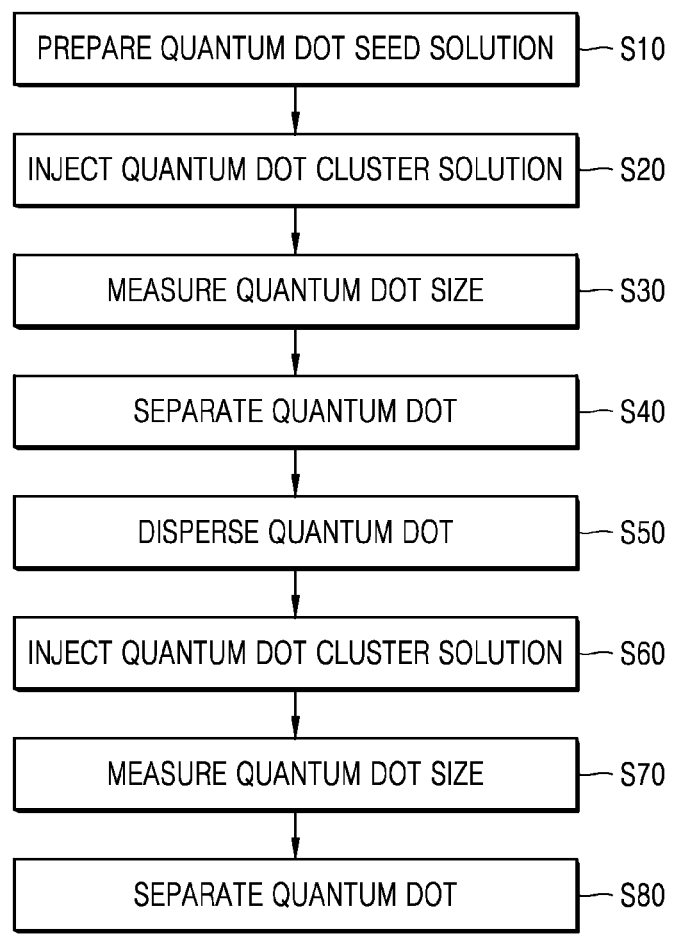
FIG. 1 is a flowchart illustrating a method of preparing quantum dots according to an embodiment.

Reference will now be made in detail to embodiments, examples of which are illustrated in the accompanying drawings, wherein like reference numerals refer to like elements throughout. In this regard, example embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

While the terms "first," "second," "third," etc., may be used to describe various elements and operations, such elements and operations must not be limited to the above terms. The above terms may be used only to distinguish one element or operation from another.

Hereinafter, a method of preparing quantum dots according to an embodiment will be described in greater detail.

As used herein, the term "quantum dot seed" is a crystalline material serving as a seed for growing a quantum dot to a desired size or a predetermined size. The term "quantum dot seed solution" is a solution including quantum dot seeds and a solvent, and may further include components such as a quantum dot precursor and a ligand.

As used herein, the term "quantum dot precursor" means a material used in preparation of quantum dots, the material including constituent components of quantum dots.

As used herein, the term "quantum dot precursor solution" refers to a solution including a quantum dot precursor.

As used herein, the term "ligand" refers to a material which is coordinated on the surface of quantum dots to aid dispersion of quantum dots or change the surface properties of the quantum dots.

As used herein, the term "quantum dot cluster" refers to an amorphous aggregate or composite consisting of the constituent components of quantum dots.

As used herein, the term "1st excitonic peak" refers to an absorption peak having a wavelength corresponding to the bandgap of excitons.

(Quantum Dot Preparation Method)

FIG. 1 is a flowchart illustrating a method of preparing quantum dots according to an embodiment. Referring to the flowchart of FIG. 1, firstly, a quantum dot seed solution is prepared (operation S10).

A quantum dot material may be, for example, Group II-VI, Group III-V, or Group IV-VI compound semiconductor comprising binary, ternary, or quaternary elements. The quantum dot material may include, for example, GaN, GaP, GaAs, GaSb, InN, InP, InAs, InGaAs, InSb, AlN, AlP, AlAs, AlSb, GaN, GaP, GaAs, GaSb, ZnO, ZnS, ZnSe, ZnTe, ZnCdSe, ZnCdTe, ZnCdS, CdS, CdSe, CdSeTe, CdSeZn, CdTe, HgS, HgSe, HgTe, GeSe, or GeTe.

The quantum dot seed may be formed by reacting precursors of quantum dot constituent components. For example, an InAs quantum dot seed may be prepared by reacting an In precursor with an As precursor. To form the InAs quantum dot seed, for example, the reaction may be caused by rapidly injecting an As precursor solution into a heated In precursor solution, for example, at a rate of 2-8 mL/hour. However, the InAs quantum dot seed formation method is not limited thereto.

As the In precursor, for example, indium acetate, indium oleate, indium myristate, indium iodide, indium chloride, or indium bromide may be used. As the As precursor, for example, tris(trimethylsilyl)arsine ($(TMS)_3As$)), tris(isopropyldimethylsilyl)arsine (($iPrDMSi)_3As$), tris(trimethylgermyl)arsine (($TMGe)_3As$), triphenylarsine ($AsPh_3$), tris(dimethylamino)arsine ($As(NMe_2)_3$), or the like may be used. The quantum dot precursor solution may be prepared using a solvent, for example, oleic acid, octadecene, dioctyl amine, oleylamine, trioctylphosphine, or the like.

Subsequently, a quantum dot cluster solution is continuously injected into the quantum dot seed solution to grow a quantum dot (operation S20).

The quantum dot cluster solution may be prepared, like the quantum dot seed solution, by reacting the precursor solutions of quantum dot components. However, unlike the quantum dot seed solution, the quantum dot cluster solution may be prepared in a low-temperature condition of 100° C. or less. The quantum dot cluster solution supplies the quantum dot components to the quantum dot to grow quantum dots.

For example, a cluster solution for forming InAs quantum dots may be prepared by reacting an In precursor solution with an As precursor solution for preparing an InAs quantum dot seed solution, at a low temperature (100° C. or less) or room temperature (e.g., 20° C.-25° C.). Here, a ratio of the In precursor to the As precursor may be, for example, 11:1 to 1:11. The ratio of the In precursor to the As precursor may be, for example, 1:1.

The quantum dot seed solution to which the quantum dot cluster solution is injected may be heated. For example, in the case of InAs quantum dots, an InAs quantum dot seed solution may be heated to 100-350° C.

The quantum dot cluster solution is injected into the quantum dot seed solution at a constant rate. For example, the quantum dot cluster solution may be continuously injected into the quantum dot seed solution at a rate of 1 to 8 mL/hour. Here, the concentration of the quantum dot cluster solution may be, for example, 0.01 to 1 mol/L.

The continuous injection of the quantum dot cluster solution may be performed until the quantum dot no longer grows. The meaning that quantum dots no longer grow refers to that the growth rate of quantum dots stops or considerably becomes slower, and thus, the size of the quantum dots hardly changes. When the growth rate of the quantum dot becomes lower than a threshold growth rate, it is determined that the quantum dot no longer grows. A change in size of the quantum dots may be identified by measuring a light absorption peak of the quantum dots in real time (operation S30). When the wavelength of the light absorption peak of the quantum dots no longer increases, it may be determined that the size of the quantum dots no longer changes or grows. Accordingly, at this time, the continuous injection of the quantum dot cluster solution may be stopped. Alternatively, when the light absorption peak of the quantum dots reaches a predetermined wavelength, it may be determined that the quantum dots have a certain size, and at this time, the continuous injection of the quantum dot cluster solution may be stopped.

After the continuous injection of the quantum dot cluster solution is stopped, quantum dots are separated from the reaction solution (operation S40). The separation of the quantum dots may be performed by centrifugation.

Subsequently, the separated quantum dots are dispersed in a solvent (operation S50). The solvent for dispersing the quantum dots may be a solvent that is the same as or different from the solvent of the quantum dot seed solution or quantum dot cluster solution. By separating the quantum dots from the reaction solution and dispersing the quantum dots in the solvent, an increase in the volume of the reaction solution caused by the continuous injection of the quantum dots, a reduction in quantum dot concentration resulting therefrom, an increase in the distance between quantum dots and quantum clusters, and an inhibited growth of quantum dots caused thereby may be prevented.

The quantum dot cluster solution is continuously injected again into the solution in which the quantum dots are dispersed (operation S60). As in operation S20, the continuous injection of the quantum dot cluster solution may be performed until the dispersed quantum dots no longer grow or the quantum dots grow to a certain size. The size and growth of the quantum dots may be determined by measurement of light absorption peaks (operation S70).

Figure 2:
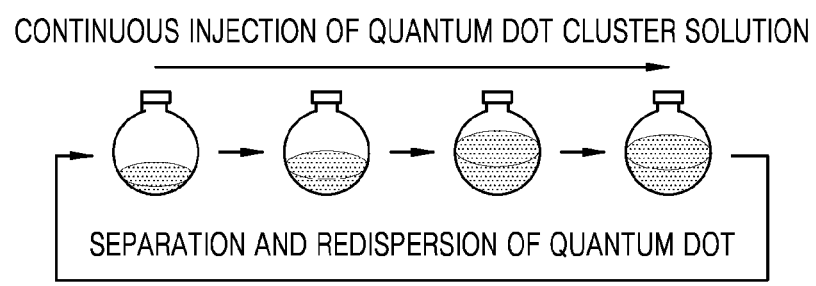
FIG. 2 is a diagram showing that the volume of a reaction solution does not increase above a certain volume, due to separation and dispersion (or redispersion) of quantum dots, in a continuous injection process according to an embodiment.

The steps of quantum dot separation (operation S40), quantum dot dispersion (operation S50), continuous injection of the quantum dot cluster solution (operation S60), and quantum dot size measurement (operation S70) may be repeated until the quantum dots grow to a desired size or a predetermined size. FIG. 2 is a diagram showing that due to the repetition of operations S40 to S70, e.g., continuous injection of the quantum dot cluster solution, and separation and dispersion of the quantum dots, the volume of the reaction solution does not increase over a certain volume or greater.

When the injection of the quantum dot cluster solution is stopped and the quantum dots reach a desired size or a predetermined size, the quantum dots may be separated from the reaction solution (operation S80), thus terminating the synthesis of the quantum dots.

In other embodiments, after the synthesis of the quantum dots, one or more layers of a shell may further be formed on the surface of the quantum dots. The shell may be formed of a material, for example, ZnSe, CdSe, CdS, ZnS, InP, GaAs, GaSb, AlSb, $SiO_2$, $TiO_2$, $Fe_2O_3$, PdO, $Cu_2O$, PbS, PbSe, HgS, ZnO, or the like. In other embodiments, the method may further include, after the synthesis of the quantum dots or after the formation of the shell, forming a desired organic or inorganic ligand on the surface of the quantum dots. To this end, for example, a ligand exchange reaction may be used.

The quantum dots prepared according to the example embodiments described above may have an absorption wavelength of a short-wave infrared (SWIR) region. The quantum dots may have an absorption wavelength of, for example, 1300 nm to 1700 nm, for example, 1350 nm to 1600 nm, or 1400 nm to 1600 nm.

In addition, the quantum dots prepared according to the embodiments described above may have a good size distribution. The quantum dots may have, for example, a diameter of 3 nm to 12 nm, or a diameter of 4 nm to 12 nm, a diameter of 6 nm to 12 nm, a diameter of 4 nm to 10 nm, or a diameter of 4 nm to 8 nm. The quantum dots may have, for example, an average size (diameter) of 6 nm to 12 nm and a relative standard deviation of 30% or less or 20% or less in the average size (diameter).

One or more embodiments will now be described in detail with reference to the following examples and comparative examples.

Example 1: Synthesis of InAs Quantum Dots

1) Preparation of in Precursor and as Precursor 1 mmol of indium acetate and 3 mmol of oleic acid (OA) were added to 5 mL of octadecene (ODE), followed by degassing at 100° C. for 2 hours or longer to prepare an indium oleate solution as an In precursor solution.

0.5 mmol of tris(trimethylsilyl)arsine (($TMSi)_3As$) and 1.5 mmol of dioctylamine (DOA) were added to 1 mL of degassed ODE and then heated at 60° C. in an $N_2$ atmosphere for 10 minutes to prepare an As precursor solution in brown.

2) Preparation of InAs Quantum Dot Seed

After the In precursor solution was heated to 300° C. in an $N_2$ atmosphere, 1.6 mL of the As precursor solution was rapidly injected into 6 mL of the In precursor solution, for example, at a rate of 2-8 mL/hour, to prepare an InAs quantum dot seed solution.

3) Preparation of InAs Quantum Dot Cluster

To grow InAs quantum dots, the previously prepared In precursor solution and As precursor solution were reacted in the same ratio as in the preparation of InAs quantum dot seed at room temperature to prepare an InAs cluster solution.

4) Growth of InAs Quantum Dots

While the InAs quantum dot cluster solution was slowly injected at a rate of 1 mL/hour into 1 mL of the InAs quantum dot seed solution reheated to 300° C., a 1st excitonic peak of quantum dots was identified with an aliquot. When the 1st excitonic peak reached 1300 nm, the injection of the InAs quantum dot cluster solution was stopped. Here, 20 mL or more of the cluster solution was consumed per 1 mL of the InAs quantum dot seed solution.

5) InAs Quantum Dot Separation

After the injection of the InAs quantum dot cluster solution into the reaction solution was stopped, the reaction solution was cooled down to room temperature, butanol was added at a volume ratio of 4 times the volume of the reaction solution, and centrifuged with a centrifuge at 6000 rpm for 5 minutes to precipitate quantum dots. Thereafter, the quantum dots separated from the reaction solution were dispersed with 10 mL of hexane. 10 mL of butanol was added to the dispersed quantum dot solution and centrifuged at 4000 rpm for 5 minutes to precipitate by-products such as indium metal, indium oxide, and the like. After transferring the supernatant above the by-products to another centrifuge, and 20 mL of butanol was added thereto and centrifuged at 6000 rpm for 5 minutes to precipitate quantum dots. 45 mL of a mixture of hexane and tubanol (1:3.5 volume ratio) was added to the centrifuged quantum dots and centrifuged at 6000 rpm for 5 minutes to precipitate quantum dots. This was performed twice to separate quantum dots.

6) Dispersion of InAs Quantum Dots

The centrifuged quantum dots were dispersed in 5 mL of hexane, and then mixed with 2 mL of ODE, in which 0.6 mmol of DOA and 0.2 mmol of indium oleate were added, to remove hexane, moisture, and oxygen in a vacuum.

7) Regrowth of InAs Quantum Dots

After centrifugation, the InAs quantum dots dispersed in ODE were degassed for 2 hours. Thereafter, the temperature of the InAs quantum dot solution was increased in an $N_2$ atmosphere to 300° C. over 30 minutes. An InAs cluster solution was injected into the InAs quantum dot solution at a rate of 1 mL per hour.

A 1st excitonic peak of the quantum dots was identified with an aliquot. When the 1st excitonic peak reached 1300 nm, the injection of the InAs quantum dot cluster solution was stopped.

8) Separation, Redispersion, and Regrowth of InAs Quantum Dots

The separation, redispersion, and regrowth of InAs quantum dots of steps 5) to 7) were performed again. Here, the injection rate of the InAs cluster solution was changed to a rate of 1 mL/hour. A 1st excitonic peak of the quantum dots was identified again with an aliquot. When the 1st excitonic peak reached about 1560 nm, the injection of the InAs quantum dot cluster solution was stopped.

9) Separation of InAs Quantum Dots

The InAs quantum dots were separated from the reaction solution using the InAs quantum dot separation method of step 5), and then redispersed in hexane.

Figure 3:
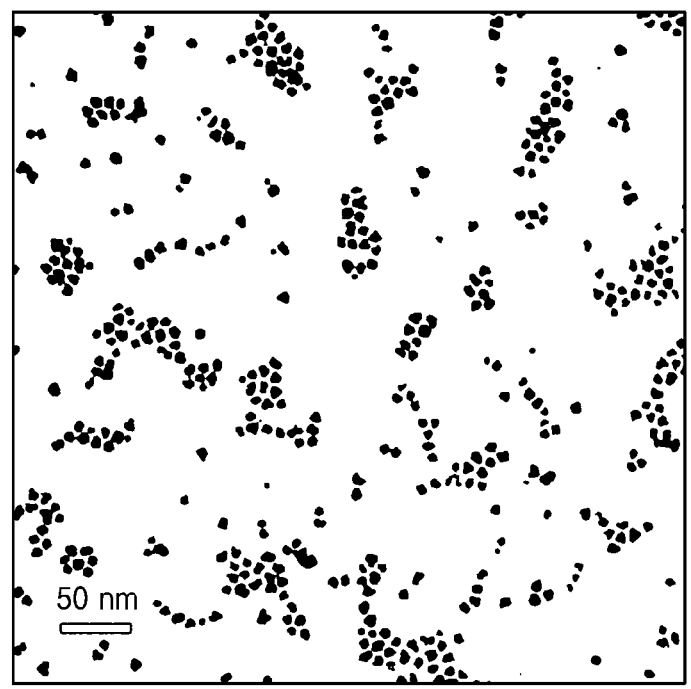
FIG. 3 shows a transmission electron microscopy (TEM) image of InAs quantum dots prepared in Example 1.

FIG. 3 shows a transmission electron microscopy (TEM) image of the InAs quantum dots prepared in Example 1. The sizes of the quantum dots in the TEM image of FIG. 3 may be measured to obtain a size distribution.

Figure 4:
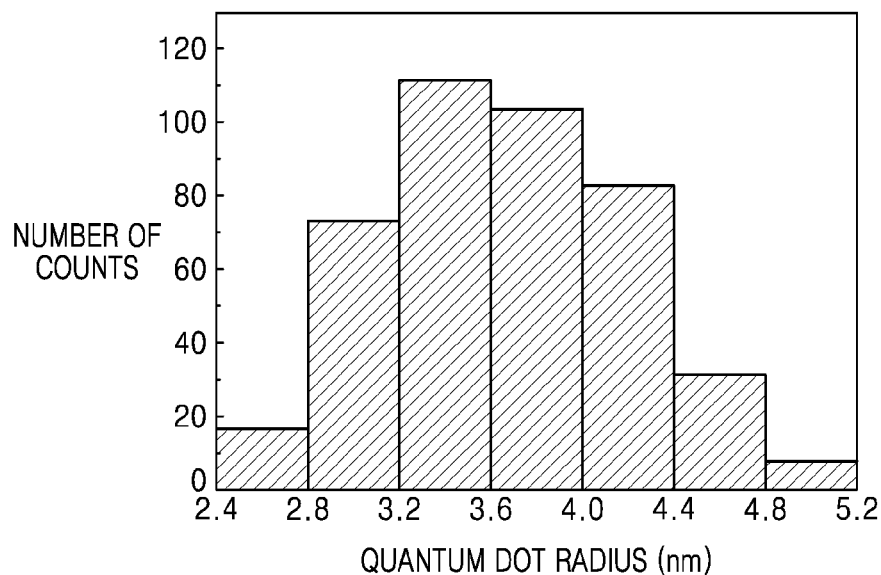
FIG. 4 is a graph showing the size distribution of InAs quantum dots prepared in Example 1.

FIG. 4 is a graph showing the size distribution of InAs quantum dots prepared in Example 1. In the graph of FIG. 4, the Y axis represents the number of quantum dots. In addition, the average size of the InAs quantum dots prepared in Example 1, the standard deviations thereof, and the relative standard deviations to the average are shown in Table 1. Referring to Table 1, the average radius of the InAs quantum dots prepared in Example 1 was 3.39 nm (average diameter: 6.8 nm), a radius standard deviation was 0.58 nm (standard deviation of the diameters: 1.16 nm), and the radius and diameter relative standard deviations were 17.2%.

TABLE 1

| Radius (nm) | Number of counts |
|---|---|
| 2.4 | 16 |
| 2.8 | 74 |
| 3.2 | 110 |
| 3.6 | 84 |
| 4.4 | 50 |
| 4.8 | 8 |
| Average radius (nm) | 3.39 |
| Radius standard deviation (nm) | 0.58 |
| Radius relative standard deviation (%) | 17.2 |
| Average diameter (nm) | 6.77 |
| Diameter standard deviation (nm) | 1.16 |
| Diameter relative standard deviation (%) | 17.2 |

Figure 5:
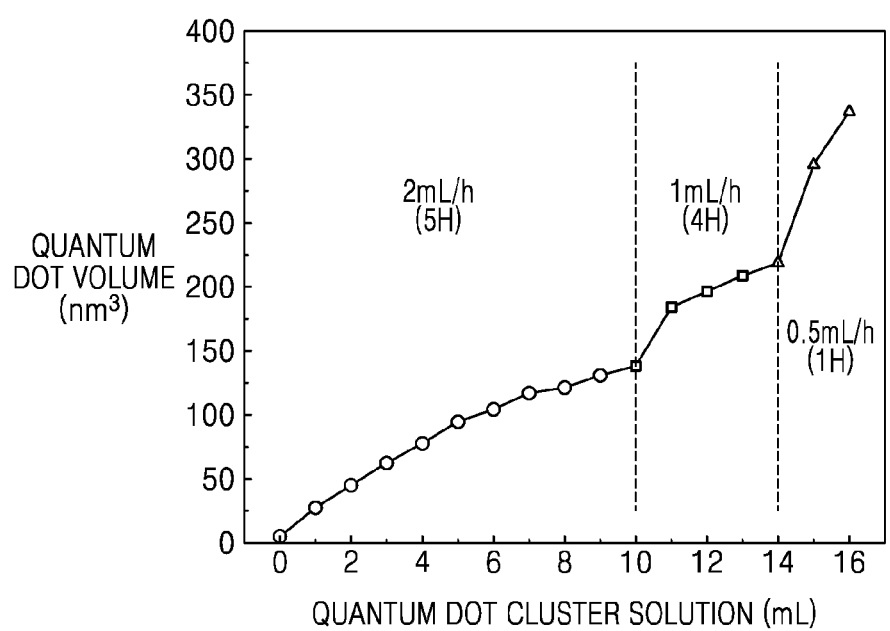
FIG. 5 is a graph of quantum dot volume according to an injection rate of a quantum dot cluster solution in the preparation of InAs quantum dots of Example 1.

FIG. 5 is a graph of quantum dot volume according to an injection rate of a quantum dot cluster solution in the preparation of InAs quantum dots of Example 1. Referring to FIG. 5, the InAs quantum dot preparation process of Example 1 may be divided into first, second, and third quantum dot growth stages, including separation and dispersion of the InAs quantum dots twice. In the first growth stage, the injection rate of the InAs quantum dot cluster solution was 2 mL/h, and in the second growth stage, the injection rate of the InAs quantum dot cluster solution was 1 mL/h, and in the third growth stage, the injection rate of the InAs quantum dot cluster solution was 0.5 mL/h. The reason for lowering the injection rate of the quantum dot cluster solution as the number of order of the growth stages increases is that the surface reactivity of the quantum dots decreases as the size of the quantum dots increases. Referring to FIG. 5, a discontinuous increase in the volume of quantum dots at the boundary between the first growth stage and the second growth stage and the boundary between the second growth stage and the third growth stage is due to the separation and dispersion steps of the quantum dots. As shown in FIG. 5, it took 10 hours for the growth of the InAs quantum dots according to Example 1.

Figure 6:
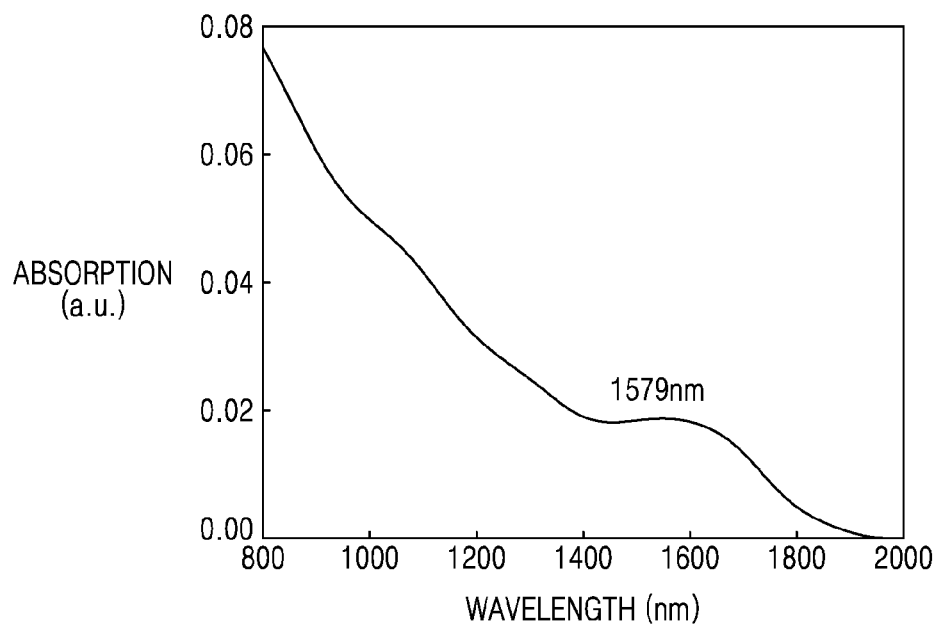
FIG. 6 shows an absorption spectrum of a short-wavelength infrared region of InAs quantum dots prepared in Example 1.

FIG. 6 shows an absorption spectrum of a short-wavelength infrared region of InAs quantum dots prepared in Example 1. Referring to FIG. 6, a peak appears between 1500 nm and 1600 nm. This corresponds to the 1st excitonic peak (1579 nm) of the InAs quantum dots.

Example 2: Si-JFET Device Including Light-Absorption Layer

Figure 7:
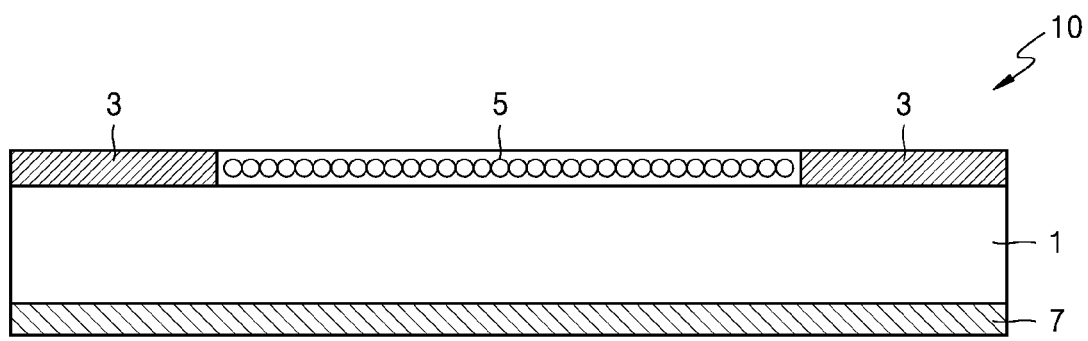
FIG. 7 is a schematic view of a junction-gate field-effect transistor (JFEF) device in which a light-absorption layer includes InAs quantum dots prepared in Example 1.

FIG. 7 is a schematic view of a Si-junction-gate field-effect transistor (FTEF) device 10 in which a light-absorption layer includes the InAs quantum dots prepared in Example 1. The Si-JFET device 10 was formed on a heavily p-type doped Si wafer with a lightly n-type doped Si layer of a thickness of about 500 nm. Referring to FIG. 7, heavily p-type doped source/drains 3 are formed on a lightly n-type doped Si layer 1, and a light-absorption layer 5 is formed between the source or drains 3. The light-absorption layer 5 was formed by deposition of a Si-doped InZnO thin film, and then, spin coating of InAs quantum dots thereon, and deposition again of a Si-doped InZnO thin film. That is, the light-absorption layer 5 has a structure in which an InAs quantum dot layer of a thickness of 10 nm is embedded between the Si-doped InZnO thin films having a thickness of 40 nm. The heavily p-type doped Si wafer corresponds to a gate 7 at an opposing side to the source and drain 3.

Figure 8:
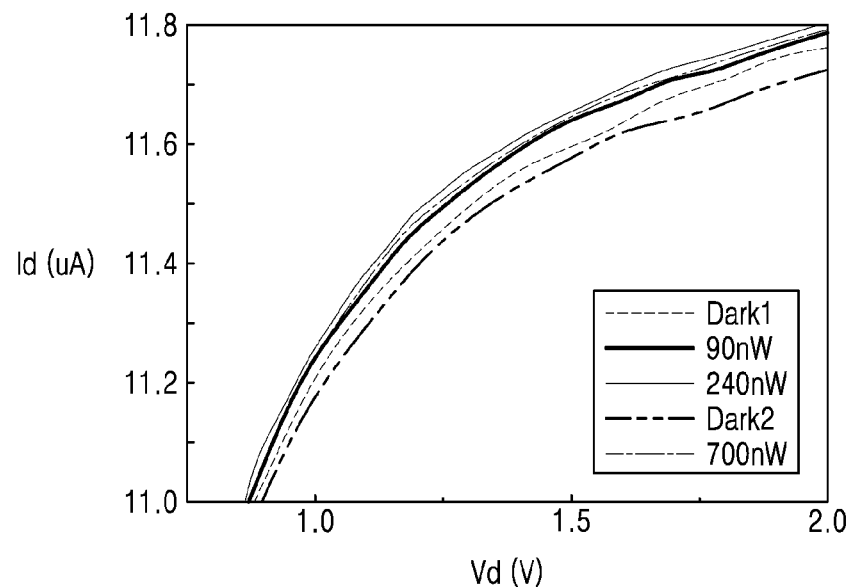
FIG. 8 shows an Id-Vd graph when the optical element of Example 2 is irradiated and not irradiated with laser light having a wavelength of 1310 nm.

FIG. 8 shows an Id-Vd graph in cases where laser light of 1310 nm wavelength is radiated onto the Si-JFET device 10 of Example 2 (e.g., graphs labeled as 90 nW, 240 nW, and 700 nW), and in cases where the laser light of 1310 nm wavelength is not radiated onto the Si-JFET device 10 of Example 2 (e.g., graphs labeled as Dark 1 and Dark 2). While a voltage of 0.5V was applied to the gate 7, the source was grounded, and a voltage (Vd) of 0V to 2V was applied to the drain, a current (Id) was measured. First, Vd-Id was measured while light was radiated onto the Si-JFET device 10 (Dark1), Vd-Id was then measured while light of 90 nW was radiated thereto (90 nW), and subsequently, Vd-Id was measured while light of 240 nW was radiated thereto (240 nW). To eliminate the effect of accumulated light radiation on the device, Vd-Id was measured in a state where there was no light radiation (Dark2), and subsequently, Vd-Id was measured in a state where there was 700 nW-light radiation (700 nW). That is, a reference to the light radiation of 90 nW and the light radiation of 240 nW is Dark1, and a reference to the light radiation of 700 nW is Dark2.

Referring to FIG. 8, it was found that the Id value was higher when light was radiated onto the Si-JFET device 10 (90 nW, 700 nW, 240 nW) than when light was not radiated thereto (Dark1, Dark2). From this result, it is understood that the light-absorption layer 5 including the InAs quantum dots absorbs light having a wavelength of 1310 nm to generate a photoelectric current. In addition, referring to FIG. 9, the higher the intensity of radiated light becomes in the order of 90 nW, 240 nW, and 700 nW, the larger the photoelectric current value excluding a dark current from Id becomes. From this result, it is understood that the larger the intensity of radiated light becomes, the photoresponsivity caused by InAs quantum dot increases more.

Figure 9:
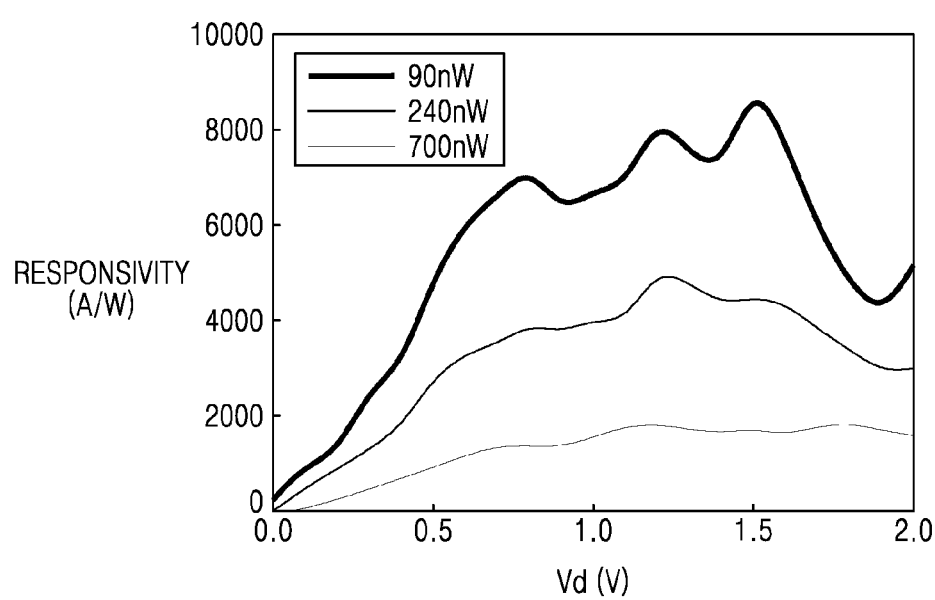
FIG. 9 is a graph showing responsivity (NW) of radiation light at different intensities according to drain voltage (Vd) with respect to a gate voltage (Vg) of 0.5 V of the optical element of Example 2.

FIG. 9 is a graph showing responsivity (A/W) of radiation light at different intensities according to drain voltage (Vd) with respect to a gate voltage (Vg) of 0.5 V of the optical element of Example 2. The responsivity is a value obtained by dividing the difference between Id(A) when irradiated with light and Id(A) when not irradiated by the intensity (W) of the radiated light. Referring to FIG. 9, the responsivity is the highest when the intensity of radiated light is 90 nW, and the responsivity is the lowest when the intensity of radiated light is 700 nW. The responsivity when the intensity of the radiated light is 240 nW has values between the responsivity of the 90 nW light and the responsivity of the 700 nW light. This is a tendency of general phototransistors. The higher the intensity of radiated light becomes, the larger the photocurrent becomes, but the lower the responsivity becomes. This is considered due to a trap filling effect.

The Si-JFET device 10 of Example 2 showed photoresponsivity to light radiation of 1310 nm, and the InAs quantum dots are only the material capable of absorbing light of 1310 nm in the Si-JFET device 10. Thus, it is known that the photocurrent of the Si-JFET device 10 of Example 2 is caused by the light absorption of the InAs quantum dots. Referring to FIG. 9, the Si-JFET device 10 of Example 2 exhibited a maximum responsivity of about 8000 A/W.

According to the one or more embodiments, in the method of producing quantum dots through a continuous injection process, by introducing the steps of separation and dispersion (or redispersion) of quantum dots, a reduction in the concentration of quantum dots involved in growth reaction, according to the continuous injection, is prevented, and thus, inhibited growth of quantum dots is prevented, and quantum dots of a short-wavelength infrared region may be produced.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:
1. A method of producing a quantum dots, the method comprising:
   a first operation of preparing a quantum dot seed solution;
   a second operation of growing a quantum dot by continuously injecting a quantum dot cluster solution into the quantum dot seed solution;
   a third operation of separating the grown quantum dot and dispersing the quantum dot in a solvent; and
   a fourth operation of further growing the quantum dot by continuously injecting the quantum dot cluster solution including quantum dot components, into the dispersed quantum dot.
2. The method of claim 1,
   wherein the second operation and the fourth operation are each performed until the quantum dot grows to a predetermined size in each of the second operation and the fourth operation.
3. The method of claim 1,
   wherein the third operation and the fourth operation are repeatedly performed until the quantum dot grows to a predetermined size.
4. The method of claim 1,
   wherein the quantum dot includes a Group II-VI, Group III-V, or Group IV-VI compound semiconductor material.
5. The method of claim 1,
   wherein the quantum dot is selected from a group consisting of GaN, GaP, GaAs, GaSb, InN, InP, InAs, InGaAs, InSb, AlN, AlP, AlAs, AlSb, GaN, GaP, GaAs, GaSb, ZnO, ZnS, ZnSe, ZnTe, ZnCdSe, ZnCdTe, ZnCdS, CdS, CdSe, CdSeTe, CdSeZn, CdTe, HgS, HgSe, HgTe, GeSe, and GeTe.
6. A method of producing an InAs quantum dot, the method comprising:
   a first operation of preparing an InAs quantum dot seed solution;
   a second operation of growing the InAs quantum dot by continuously injecting an InAs quantum dot cluster solution into the InAs quantum dot seed solution;
   a third operation of separating the InAs quantum dot; and
   a fourth operation of further growing the InAs quantum dot by continuously injecting the InAs quantum dot cluster solution into the InAs quantum dot.
7. The method of claim 6,
   wherein the InAs quantum dot finally grown has a diameter of 3 nm to 12 nm.
8. The method of claim 6,
   wherein the InAs quantum dot finally grown has an absorption wavelength of 1400 nm to 1600 nm.
9. The method of claim 6,
   wherein the InAs quantum dot seed solution in the second operation is a solution heated to 100-350° C.
10. The method of claim 6,
    wherein the InAs quantum dot cluster solution in the second operation is of room temperature.
11. The method of claim 6,
    wherein the second operation is performed until the InAs quantum dot has a predetermined size.
12. The method of claim 6,
    wherein the second operation is performed until the InAs quantum dot has a predetermined absorption wavelength.

13. The method of claim 6, wherein the second operation is performed until an absorption wavelength of the InAs quantum dot does not change.

14. The method of claim 6, wherein the third operation and the fourth operation are repeatedly performed until the InAs quantum dot grows to a predetermined size.

15. The method of claim 6, further comprising preparing the InAs quantum dot seed solution by injecting an As precursor solution into an In precursor solution.

16. The method of claim 6, further comprising preparing the InAs quantum dot cluster solution by causing an In precursor solution to react with an As precursor solution in a ratio of 11:1 to 1:11 by volume at room temperature.

17. A InAs quantum dot prepared by the method of claim 6, wherein the InAs quantum dot has a local peak absorption wavelength between 1500 nm and 1600 nm.

18. The InAs quantum dot of claim 17, wherein the local peak absorption wavelength corresponds to an excitonic peak of the InAs quantum dot.

19. A photodevice comprising a light-absorption layer including the InAs quantum dot of claim 17.

20. The photodevice of claim 19, further comprising a photodetector.

* * * * *